Feb. 27, 1951      R. B. COLT      2,542,995
PREDETERMINED QUANTITY SUMMING APPARATUS
Filed Sept. 27, 1946      2 Sheets-Sheet 1

Inventor
RUTGER B. COLT

By George V Ettgrath
Agent

Feb. 27, 1951 R. B. COLT 2,542,995
PREDETERMINED QUANTITY SUMMING APPARATUS
Filed Sept. 27, 1946 2 Sheets-Sheet 2

Inventor
RUTGER B. COLT

By George V Eltgroth
Agent

Patented Feb. 27, 1951

2,542,995

UNITED STATES PATENT OFFICE 2,542,995

PREDETERMINED QUANTITY SUMMING APPARATUS

Rutger B. Colt, Baltimore, Md., assignor to Bendix Aviation Corporation, Baltimore, Md., a corporation of Delaware Application September 27, 1946, Serial No. 699,931

5 Claims. (Cl. 235—132)

This invention relates to apparatus carrying out a control operation in response to one or more data impulses, and more particularly to such apparatus in which, after receipt of any desired number of data impulses, the apparatus may be reset to a reference position before the receipt of later incoming data.

In the development of the art of automatic controls, there have arisen many applications in which control is to be effected, not in accordance with a single reading or observation, but in accordance with the average of a number of such observations, or otherwise stated, with the sum of several such measurements or indications. Where such a type of control is desired, the data under measurement may be converted into electric power impulses each proportional to or rigidly related in some other fashion to the magnitude of the measured quantity. If these power impulses are now employed to sequentially energize an electric motor, the motor displacement, neglecting inertia effects, will be proportional to the sum of the impulses so applied. By providing some means for returning the motor-driven summing assembly to a reference position after the summation of a given impulse sequence, the motor displacement at the end of an impulse train may be made to indicate the average of the impulses so applied. Apparatus incorporating a summing mechanism of this type is described in detail in my copending application, Serial No. 620,211, filed October 4, 1945, now Patent No. 2,467,929 of April 19, 1949. The summing mechanism described in the instant specification has been devised to overcome the difficulties attended upon a direct and continuously coupled system, and may be advantageously substituted for the summing device shown in said copending application.

It is a primary object of the invention to provide new and novel means additively responsive to a series of data impulses of varying length which may be conveniently returned to a reference position upon the completion of a summation sequence.

Another object of the invention is to provide new and novel electric circuit controlling means responsive to a series of electric pulses.

Yet another object of the invention is to provide new and novel data impulse summing means in which provision is made for selectively disengaging the data responsive driving element and a driven control element.

A further object of the invention is to provide new and novel cam actuated switching means.

Still another object of the invention is to provide a cam-type control actuator in which the movement differential required for a change in control effect is adjustable.

Other objects of the invention will in part be described and in part be obvious when the following specification is read in conjunction with the drawings in which.

Figure 1:
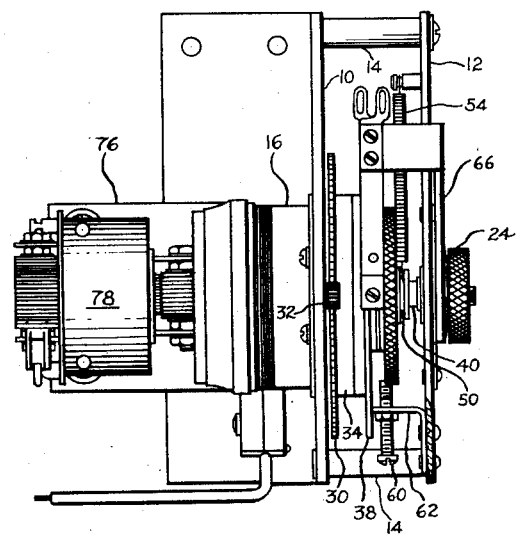
Fig. 1 is a top view of a circuit controller embodying the improvements of the invention.

In these drawings, corresponding reference characters designate corresponding parts in the various figures. Referring now to the drawings, it will be seen that this summing apparatus is assembled on a main plate 10 and an auxiliary plate 12 separated one from the other by the spacer bushings 14. Electric power impulses which may consist of energy at the commercial line frequency, keyed on and off at intervals determined by the observation of the moment, are applied to an electric motor and gear reduction assembly 16 via its associated power input leads. The motor in the assembly 16 is of the self-starting synchronous type, and the gear reduction within the assembly 16 reduces the motor shaft speed to a much lower output shaft speed. The extent of this reduction is such that, while the rotor is capable of driving the output shaft, yet in the absence of motor energization, the application of a driving torque to the output shaft will not cause displacement of the rotor.

A bearing sleeve 18 is mounted in main plate 10 and, in a corresponding position on the auxiliary plate 12, there is mounted a second bearing sleeve 20. Bearing sleeve 20 is recessed to receive a ball bearing 22, and the extension of sleeve 20 which passes through auxiliary plate 12 is threaded to receive a clamping nut 24. A shaft 26 extends through bearing 22 and the bearing sleeve 18 with sufficient clearance to permit free axial movement thereof. The opening at the end of bearing sleeve 18 facing away from the auxiliary plate 12 is reduced in diameter, and a ball 28 is inserted between the end of shaft 26 and this region of reduced diameter.

Figure 2:
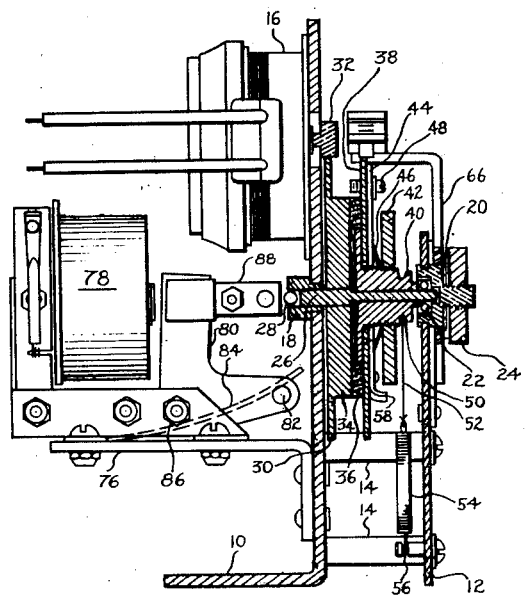
Fig. 2 is a side view partly in section of such a circuit controller.
Figure 3:
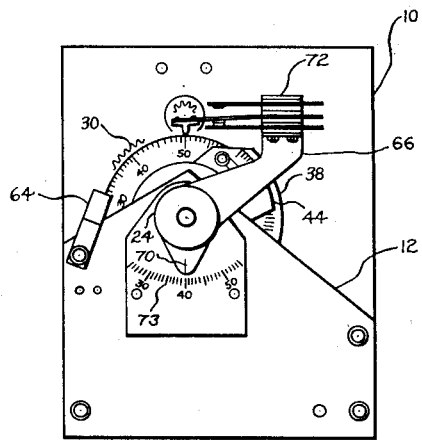
Fig. 3 is an end view of the circuit controller of Figs. 1 and 2.
Figure 4:
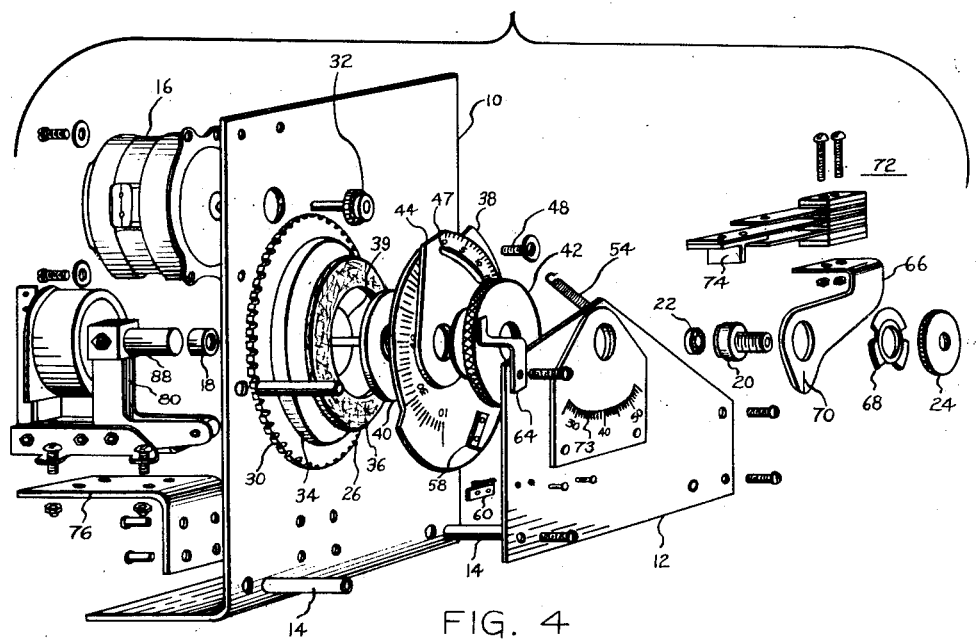
Fig. 4 is an exploded isometric view clearly illustrating the various parts making up the controller.

A portion of the periphery of the ball 28 extends beyond bearing sleeve 18, whereby an external movable element engaging the exposed ball surface will move the shaft 26 longitudinally in its bearing supports. This may be most clearly seen in Fig. 2. A driving element 30 with a geared periphery is secured to the shaft 26 adjacent main plate 10, and moves as a unit therewith. The peripheral gearing of the driving element 30 is engaged by a pinion 32 mounted on the output shaft of the motor assembly 16. The driving element 30 is provided with an annular boss 34, and adjacent hereto is mounted an annular friction ring 36 which may be of cork. The friction ring 36, on the side facing auxiliary plate 12, adjoins a cam disk 38 secured to a sleeve 40 freely mounted on the shaft 26 by the clamping action of a clamp screw 42 threaded on one end of the sleeve 40. A spring washer 39, located within annular boss 34 and bearing on driving element 30 and the enlarged inner end of sleeve 40, tends to separate these parts and disengage the driving connection.

A differential cam sector 44 swinging pivotally about sleeve 40 is located between the clamp screw 42, the clamp screw spring washer 46, and the cam disk 38. The differential cam sector 44 is slotted at 47 and locked in position to the cam disk 38 by a screw 48 extending through slot 47 into a tapped aperture in the cam disk 38. A graduated scale on the differential cam sector indicates the control differential for which the apparatus is set, the reading being taken at a point opposite the head of the differential locking screw 48.

The reduced end of the sleeve 40 extends beyond the milled lock nut 42 and is there turned down to provide a drum 50 to which there is secured a restoring cord 52 attached at its other end to a spring 54 anchored to the auxiliary plate 12 by the screw 56. As the drum 50 rotates spring 54 is extended developing a restoring force tending to return the cam disk 38 to its reference position. A stop lug 58 is riveted to the cam disk 38 adjacent its periphery and is limited in its reverse motion by the stop screw 60 mounted in a bracket 62 carried by auxiliary plate 12.

A scale index 64 is attached to the upper left-hand corner or auxiliary plate 12 and is bent and extended so that its free end extends to within a short distance of a graduated scale located on the cam disk 38. The index 64 serves the double function of indicating the average value of the condition under measurement after the completion of a predetermined number of summing operations, and also serves as a stop to limit travel in the forward direction when the stop lug 58 engages the index 64.

A contact arm 66 is pivoted on the exterior of the bearing sleeve 20 and clamped thereto by the milled nut 24 over a spring washer 68. A depending portion 70 of the arm 66 is provided with an index mark moving adjacent a scale 73 mounted on the auxiliary plate 12, and the free end of the arm 66 is laterally bent and perforated to receive a contact spring pile-up assembly indicated generally at 72. In the illustrated switch assembly there is shown a single pole double throw switch with the central resilient member actuated by a rubbing block 74 of a length sufficient to engage both the cam disk 38 and the adjacent differential cam sector 44. When the low dwell portion of the cam disk 38 lies under rubbing block 74 the lower pair of contacts is engaged, and when the high dwell portion of cam disk 38 lies under rubbing block 74 the upper pair of contacts is engaged. The radius of the periphery of the differential cam sector 44 is intermediate that of the high and low dwell portions of the cam disk 38 so that when the differential cam sector lies under rubbing block 74, the central contact member of the switch 72 is disengaged from the side contacts.

A relay bracket 76 is attached to and extends from the main plate 10 on the side thereof opposite that facing auxiliary plate 12. The bracket 76 carries an electromagnetic relay 78 with an L-shaped armature 80 having a pin 82 engaged by a leaf spring 84 tending to rotate the bell crank lever in a clockwise sense about its pivot at 86. This drives the push rod 88 secured to armature 80 into engagement with the surface of ball 28 protruding from bearing sleeve 18 to move the shaft 26 in the direction of auxiliary plate 12.

Energization of the relay 78 through its connecting leads attracts the armature 80, overcoming the influence of the spring 84 and retracts the push rod 88 from the ball 28.

From the foregoing description and the consideration of the drawings, the mode of operation of the device becomes immediately apparent. Successive electric impulses of varying lengths are applied to the input leads of the motor assembly 16. This rotates the driving pinion 32 for a time and in an amount proportional to the time during which the motor assembly 16 is energized. The driving element 30 is rotated by pinion 32 a corresponding amount and, assuming the electromagnetic relay 78 to be de-energized, this motion is transmitted through the friction ring 36 to the cam disk 38 which is here the driven element. Upon the cessation of power input to the motor assembly 16, the position to which the driven element has been moved is retained since the reduction gearing between the motor 16 and pinion 32 has so great a ratio that the restoring force developed by the restoring spring 54 actuating through the restoring cord 52 is insufficient to produce motion of the cam disk 38. Hence, during successive periods of power application to the motor assembly 16, the cam disk 38 will continue to be moved in the same direction, and its position at any instant is substantially proportional to the total length of time during which the motor assembly 16 has been energized.

At the end of a predetermined number of summation operations, the switch or electric controller 72 may be connected in circuit with the apparatus under control by means not here material. Thereafter, the coil of the electromagnetic relay 78 is energized retracting the push rod 88 from its engaged position with ball 28. The shaft 26, under the influence of spring washer 39, located between the driving element 30 and the inner enlarged end of sleeve 40, moves toward the main plate 10 disengaging the driving element 30 from the friction ring 36, thereby permitting free return of the cam disk 38 and differential cam sector 44 under the influence of restoring spring 54. Upon de-energization of the relay 78, the armature 80 is released and rotates clockwise under the influence of leaf spring 84 to re-engage the push rod 88 with the ball 28 and effectively reconnect the driving element 30 and the driven element 38.

The value of the condition under measurement at which the switch assembly 72 is actuated may be adjusted by loosening the milled clamp nut 24 and rotating the arm 66 on the bearing 20, the index marked 70 indicating the point in the apparatus illustrated at which the central contact of switch 72 engages the upper contact member.

As earlier remarked, the average value of the condition under measurement is read from the scale on cam disk 38 at a point adjacent the end of the index pointer 64.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalents of the claims are therefore intended to be embraced thereby.

What is claimed and desired to be secured by United States Letters Patent is:

1. In data responsive apparatus, a frame including a pair of plates spaced one from the other, a bearing sleeve mounted in one of said plates, a shaft journaled in said bearing sleeve and in the other of said plates and adapted for axial displacement therein, a driving element secured to said shaft, a sleeve mounted freely on said shaft and bearing a cam disk having a periphery characterized by portions of different radii, said driving element and freely mounted sleeve lying on said shaft between said plates, means exerting a force on said shaft in a direction tending to move said driving element toward said cam disk, means for freeing said shaft from the action of said force, motive means, a nonreversible transmission connecting said motive means and said driving element, energy storing means urging said cam disk in a direction opposite the motion imparted thereto by said driving element, an arm pivoted on the exterior of said bearing sleeve, and a control member carried by said arm movable about said periphery of said cam disk.

2. The combination defined in claim 1, wherein a differential control sector is adjustably secured to said cam disc, said sector having a peripheral radius intermediate that of said portions of different peripheral radii of said cam disc.

3. The combination defined in claim 2, wherein said cam disc is provided with a graduated scale on one surface thereof, an index is mounted adjacent and in cooperating relationship with said graduated scale, and a stop abutment projects from said disc and traverses a path intersecting and engaging said index to limit the motion of said cam disc in the direction imparted thereto by said driving element.

4. The combination defined in claim 3, wherein said stop abutment projecting from said cam disc traverses a path intersecting and engaging a second stop abutment mounted on said frame to limit motion of said cam disc in the direction imparted thereto by said energy storing means.

5. The combination defined in claim 4, wherein said pivoted arm has an extended portion forming an index, and a graduated scale is mounted adjacent and in cooperating relationship with said index portion of said arm.

RUTGER B. COLT.

REFERENCES CITED

The following references are of record in the file of this patent:

UNITED STATES PATENTS

| Number | Name | Date |
|---|---|---|
| 1,025,726 | Waller, Jr. | May 7, 1912 |
| 1,194,937 | Bertram | Aug. 15, 1916 |
| 1,610,882 | Reynolds | Dec. 14, 1926 |
| 1,851,247 | Hall | Mar. 29, 1932 |
| 2,140,755 | Littell | Dec. 20, 1938 |

FOREIGN PATENTS

| Number | Country | Date |
|---|---|---|
| 558,969 | Great Britain | 1944 |